(12) United States Patent
Mimura (10) Patent No.: US 8,789,639 B2
(45) Date of Patent: Jul. 29, 2014

(54) ELECTRIC THREE-WHEEL VEHICLE

(71) Applicant: Honda Motor Co., Ltd., Tokyo (JP)

(72) Inventor: Masahide Mimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/851,155

(22) Filed: Mar. 27, 2013

(65) Prior Publication Data

US 2013/0281249 A1    Oct. 24, 2013

(30) Foreign Application Priority Data

Mar. 30, 2012   (JP) .................................. 2012-078598

(51) Int. Cl.
*B62D 61/06*     (2006.01)

(52) U.S. Cl.
USPC ........ 180/210; 180/65.1; 180/65.6; 180/68.5; 180/214

(58) Field of Classification Search
USPC ............... 180/210, 211, 214, 216, 65.1, 65.6, 180/65.3, 68.5
See application file for complete search history.

(56) References Cited

U.S. PATENT DOCUMENTS

| | | | | |
|---|---|---|---|---|
| 3,179,199 A | * | 4/1965 | Moran | 180/65.6 |
| 4,570,739 A | * | 2/1986 | Kramer | 180/216 |
| 5,460,234 A | * | 10/1995 | Matsuura et al. | 180/65.1 |
| 7,311,167 B2 | * | 12/2007 | Takayanagi et al. | 180/215 |
| 7,419,024 B1 | * | 9/2008 | Tavantzis | 180/210 |
| 7,980,343 B2 | * | 7/2011 | Mogi | 180/65.6 |

FOREIGN PATENT DOCUMENTS

JP         2011-020558       2/2011

* cited by examiner

*Primary Examiner* — Toan To
(74) *Attorney, Agent, or Firm* — Squire Patton Boggs (US) LLP (57) ABSTRACT

An electric motor and a differential mechanism are placed near a vehicle body left-right center line distributed between the left and right sides of the vehicle body. In addition, at least parts respectively of the electric motor and the differential mechanism are placed on the vehicle body left-right center line. A deceleration mechanism is placed away from the vehicle left-right center line on one of the left and right sides of the vehicle.

14 Claims, 3 Drawing Sheets

ELECTRIC THREE-WHEEL VEHICLE

BACKGROUND

1. Field

The present invention relates to an electric three-wheel vehicle.

2. Description of Related Art

According to Patent Document 1 (Japanese Patent Publication No. 2011-020558), in an electric three-wheel vehicle, a power unit is placed between the left and right rear wheels (driving wheels). A case of the power unit includes left and right case bodies and a right case cover. An electric motor and a damper mechanism, which connects the electric motor and a transmission (power transmission mechanism), are placed between the left and right case bodies. The transmission and a differential mechanism are placed between the right case body and the right case cover. The electric motor is placed on one of the left and right sides of the vehicle body with respect to the vehicle body left-right center. The damper mechanism is placed at the vehicle body left-right center; and the transmission and the differential mechanism are placed on the other of the left and right sides of the vehicle body. Axle cases are provided between the left case body and the left rear wheel, and between the right case body and the right rear wheel.

The foregoing conventional configuration has a layout in which the electric motor, the transmission and the differential mechanism are distributed between the left and right sides of the vehicle body, and thereby enhances the weight balance between the left and right sides. However, the conventional configuration has a problem that the left-right width of the power unit is large.

SUMMARY

In view of the above, an object of the present invention is to enhance the weight balance between the left and right sides, as well as to make the power unit smaller in size, in the electric three-wheel vehicle with the power unit placed between the left and right rear wheels.

One embodiment of the invention provides an electric three-wheel vehicle including a single driven wheel, paired left and right driving wheels, and a power unit provided between the left and right driving wheels. The power unit can include a first case body, a second case body attached to one of the left and right sides of the first case body, and a case cover covering the other of the left and right sides of the first case body. An electric motor can be placed between the first case body and the second case body. A power transmission mechanism can be placed between the first case body and the case cover, and a differential mechanism can be placed between the first case body and the case cover. The electric three-wheel vehicle is configured such that the electric motor and the differential mechanism are placed near a vehicle body left-right center distributed between the left and right sides of a vehicle body. At least parts respectively of the electric motor and the differential mechanism are placed on the vehicle body left-right center. The power transmission mechanism can be placed away from the vehicle body left-right center on the one of the left and right sides of the first case body.

In another embodiment, the electric motor can be placed on one of the left and right sides of the vehicle body, and the differential mechanism is placed on the other of the left and right sides of the vehicle body. In a side view of the vehicle body, at least parts respectively of the electric motor and the differential mechanism overlap each other.

In another embodiment, the power unit includes a centrifugal clutch configured to connect and disconnect power transmission between the electric motor and the power transmission mechanism. The electric motor can be placed on one of the left and right sides of the vehicle body. The differential mechanism can be placed on the other of the left and right sides of the vehicle body. The centrifugal clutch can be placed beside the electric motor on the one of the left and right sides of the vehicle body.

In another embodiment, the power unit can include a partition wall between the electric motor and the centrifugal clutch.

In another embodiment, axle cases covering left and right driving wheel axles are integrally formed in the second case body and the case cover, respectively.

In another embodiment, a controller of the electric motor is attached to any one of front, rear, upper and lower end portions of the power unit. The electric motor and the differential mechanism are placed within a range of a left-right width of the controller.

In another embodiment, in a side view of the vehicle body, a straight line joining a rotation center of a driving shaft of the electric motor and a rotation center of the differential mechanism extends frontward and rearward, and the controller is placed crossing the straight line.

Embodiments of the invention place the electric motor and the differential mechanism, which are large and heavy items, near the vehicle left-right center in preference to the power transmission mechanism whose weight is relatively easy to reduce, and can thereby enhance the weight balance between the left and right sides. In addition, certain embodiments make the power unit smaller in size because the power unit protrudes less outward in the left-right direction with the electric motor and the differential mechanism overlapping each other in the left-right direction.

Certain embodiments make the electric motor and the differential mechanism overlap each other in the front-rear direction or in the vertical direction while reducing the left-right width of the power unit, and can thereby make the power unit smaller in size in the side view of the vehicle body.

Certain embodiments enable the vehicle to easily start with the assistance of the centrifugal clutch, and can enhance the weight balance between the left and right sides with the assistance of the centrifugal clutch and the power transmission mechanism.

Certain embodiments make it possible to avoid the influence of heat between the centrifugal clutch and the electric motor.

Certain embodiments make it possible to reduce the number of parts, and to enhance ease of assembly of the parts.

Certain embodiments can shorten the wirings between the controller and the electric motor by attaching the controller to the power unit, and can make it easier to assemble the power unit and the controller to the vehicle body by uniting the power unit and the controller together.

Certain embodiments make it possible to secure a space above the power unit by placing the electric motor and the differential mechanism, which are bulky items, in the front-rear direction. In addition, certain embodiments make it possible to make the positions of the electric motor and the differential mechanism lower, as well as to make the center of gravity of the power unit lower.

DETAILED DESCRIPTION

Explanations will be hereinbelow provided for an embodiment of the present invention by referring to the drawings. It should be noted that the directions, such as frontward, rearward, leftward and rightward, in the following explanations are the same as the directions in the light of the vehicle to be described below unless otherwise stated therein. In addition, an arrow FR indicating a direction to the front of the vehicle, an arrow LH indicating a direction to the left of the vehicle, and an arrow UP indicating a direction to the top of the vehicle are shown at appropriate places in the drawings used for the following explanations.

Figure 1:
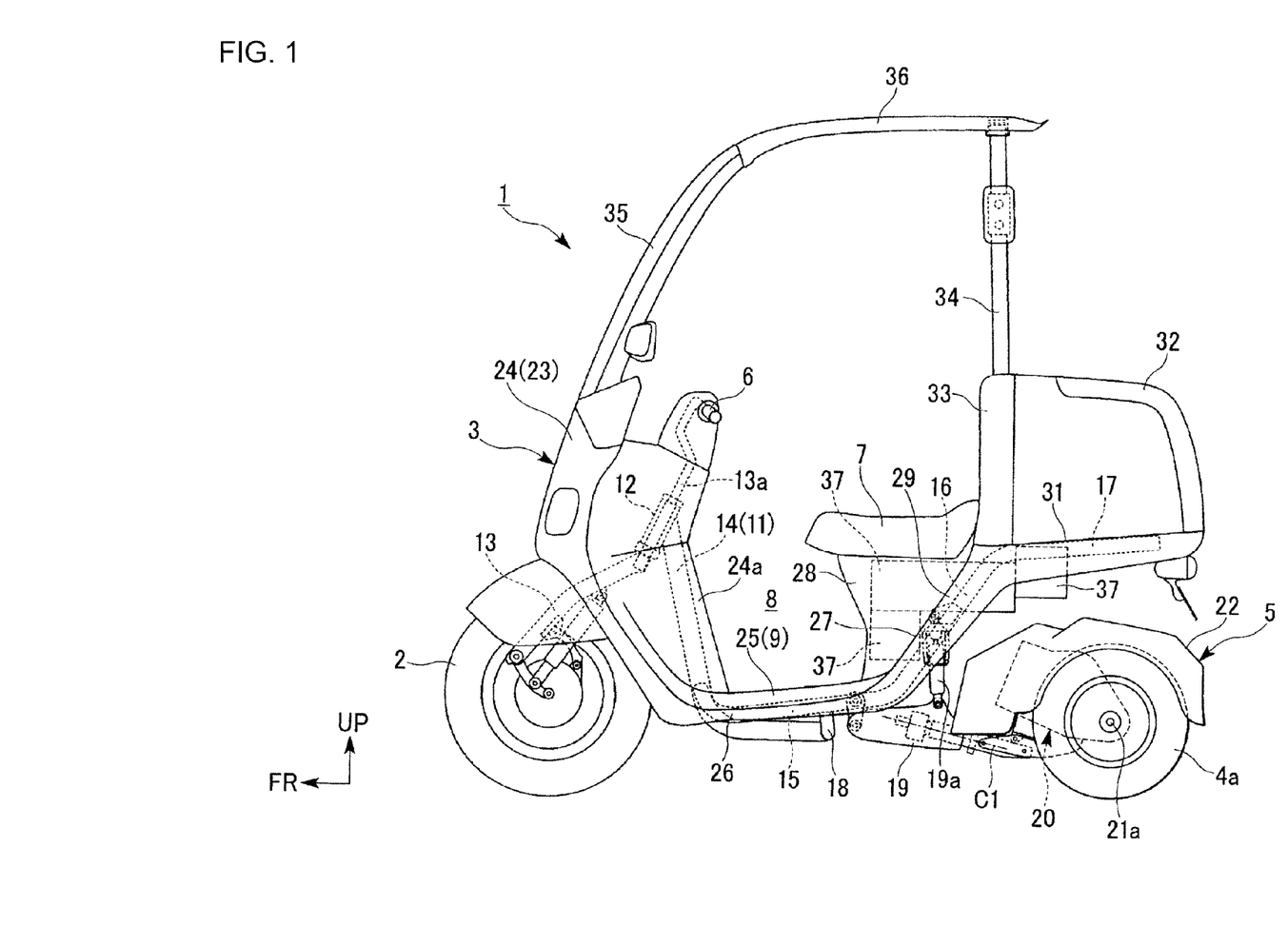
FIG. 1 is a left side view of a motor tricycle of an embodiment of the present invention.

A motor tricycle 1 shown in FIG. 1 is an example of a swing-type vehicle in which a single front wheel 2, which is a steering wheel, is supported by a front vehicle body 3. Left and right rear wheels 4a, 4b (see FIG. 3), which are two driving wheels, are supported by a rear vehicle body 5. The front vehicle body 3, which can support a rider, is capable of swinging (rolling) leftward and rightward with respect to the rear vehicle body 5 which makes the left and right rear wheels 4a, 4b contact the ground. In the front vehicle body 3, a space between a bar handle 6 for steering the front wheel and a seat 7 on which the rider is seated is defined as a straddle space 8, and a lower-deck floor 9 is placed under the straddle space 8.

A body frame 11, which is a skeletal structure of the front vehicle body 3, has a head pipe 12, which tilts rearward from the vertical direction, at its front end portion. A bottom-link type front wheel suspension system 13, for example, is steerably pivotally supported by the head pipe 12. The bar handle 6 is fixed to the upper end portion of a stem pipe 13a of the front wheel suspension system 13 which penetrates through the head pipe 12.

The vehicle body frame 11 includes a single front frame 14 extending obliquely rearward downward from the rear portion of the head pipe 12 and then being curved rearward. Paired left and right lower frames 15 branch leftward and rightward from the two sides of the curved portion of the front frame 12, and extend rearward; paired left and right rear frames 16 curvedly extend obliquely rearward upward from the rear end portions of the left and right lower frames 15. Paired left and right cargo bed frames 17 curvedly extend rearward from the rear end portions of the left and right rear frames 16. The rear end portion of the front frame 14 is connected to a middle portion of a lower cross-pipe 18 spanning between the left and right lower frames 15.

A rolling joint 19, configured to swingably join the front and rear vehicle bodies 2, 5 is supported by the rear portions of the left and right lower frames 15 in a way that is swingable upward and downward. The rolling joint 19 constitutes a so-called a Neidhart mechanism between its front and rear portions. In the drawing, reference numeral C1 denotes a swing center axis of the rolling joint 19. The front portion of the rolling joint 19 is supported by the left and right lower frames 15 in a way that is swingable upward and downward, and is supported by the left and right rear frames 16 with the assistance of a rear cushion 19a. The rear portion of the rolling joint 19 is connected to the rear vehicle body 5.

Figure 2:
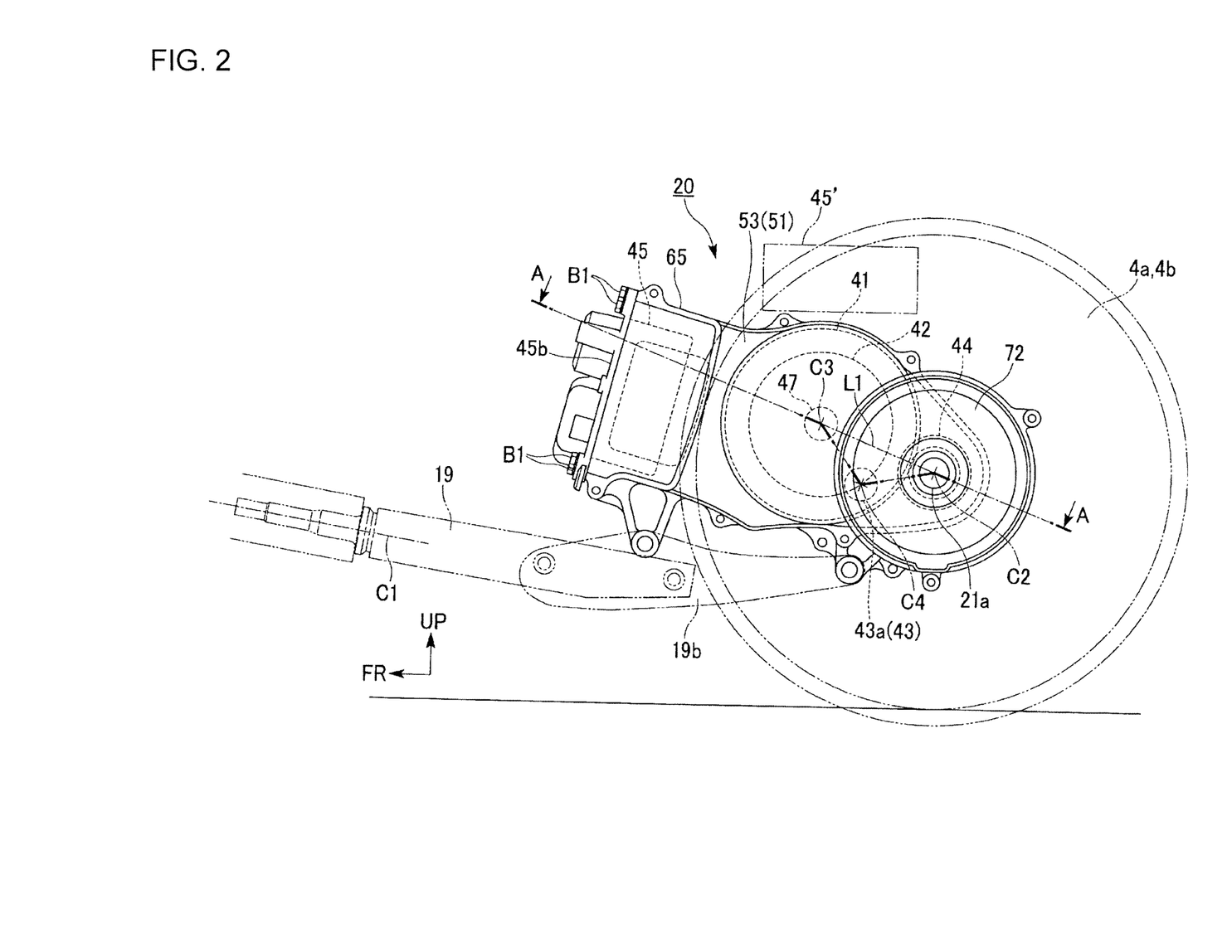
FIG. 2 is a left side view of a power unit of the motor tricycle.

Referring to FIG. 2 together, the rear vehicle body 5 has a power unit 20 which is placed between the left and right rear wheels 4a, 4b. The rear portion of the rolling joint 19 is connected to the lower front portion of the power unit 20 with the assistance of a hanger plate 19b. Left and right rear wheel axles 21a, 21b configured to support the left and right rear wheels 4a, 4b project from the two sides of the rear portion of the power unit 20. An upper portion of the rear vehicle body 5 is covered with a rear vehicle body cover 22 which concurrently works as a fender for the left and right rear wheels 4a, 4b.

Referring to FIG. 1, a front vehicle body cover 23 configured to cover the front vehicle body 3 includes a front cover 24 and an inner cover 24a configured to cover the head pipe 12, the front frame 14 and their vicinities from the front and the rear. A floor board 25 continues from a rear part of the lower end portion of the inner cover 24a. Left and right floor side covers 26 continue from lower parts of the left and right side edge portions of the floor board 25. Left and right rear floors 27 continue from the left and right rear parts of the floor board 25. An under-seat cover 28 rises between the left and right rear floors 27. Left and right rear side covers 29 continue from obliquely upper rear parts of the rear end portions of the left and right floor side covers 26, and cover lateral sides of the rear frames 16 and the cargo bed frames 17.

The front cover 24 and the inner cover 24a constitute a leg shield configured to cover the legs of the rider from the front. The floor board 25, together with the left and right lower frames 15, constitutes the lower-deck floor 9. A cargo bed 31 on which to mount a cargo storage box 32 is provided between the left and right rear side covers 29. A cargo bed front wall portion 33 rises from the front end portion of the cargo bed 31. Paired left and right support posts 34 rise upward from the cargo bed front wall portion 33. A wind screen 35 rises from the upper end portion of the front cover 24, and a roof 36 is provided in such a manner as to extend across a space defined by the upper end portion of the wind screen 35 and the upper end portions of the left and right support posts 34.

Multiple battery boxes 37 supported by the left and right rear frames 16, the left and right cargo bed frames 17 and the like are placed inside the under-seat cover 28, as well as between the left and right rear side covers 29. A high-voltage battery with 48 to 72 volts, a BMU (Battery Management Unit), a low-voltage battery with volts and the like (which are not illustrated) are housed in the battery boxes 37. The high-voltage battery is a power source for an electric motor 41 which is a power plant of the motor tricycle 1. The BMU is configured to manage the charge, discharge and the like of the high-voltage battery. The low-voltage battery is an auxiliary power source.

Figure 3:
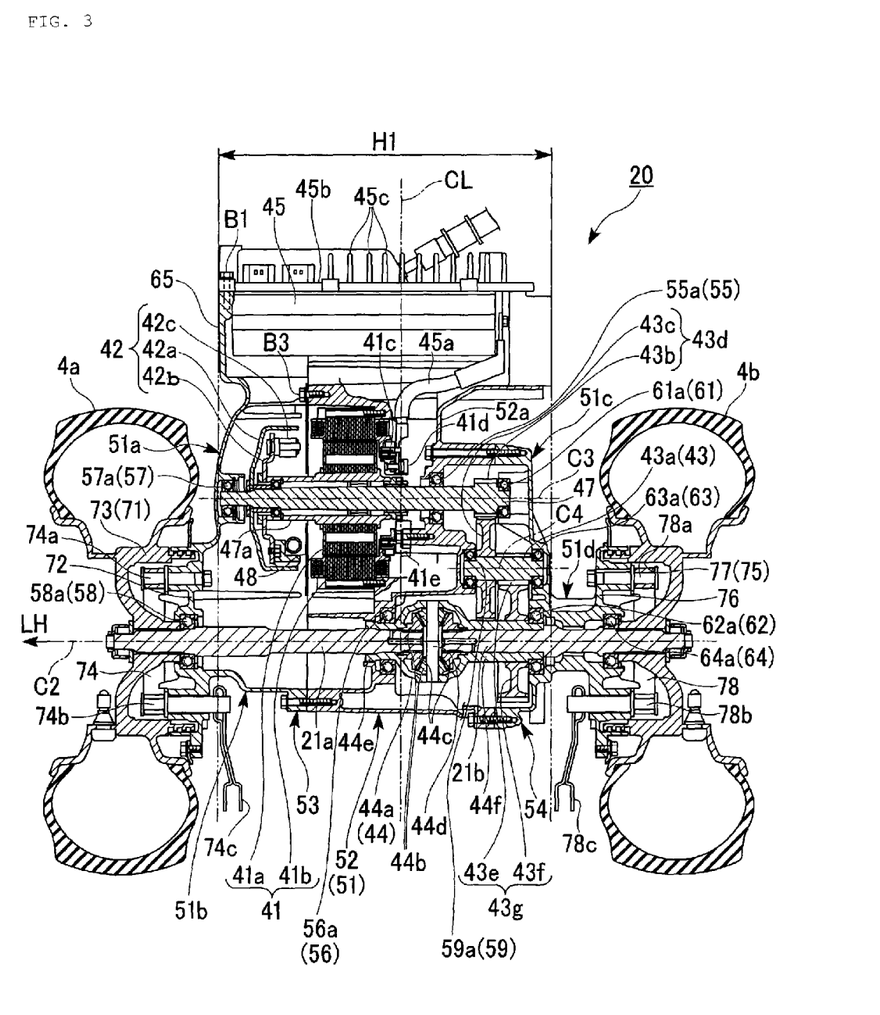
FIG. 3 is a cross-sectional view taken along the A-A line of FIG. 2.

Referring to FIGS. 2 and 3, the driving power of the electric motor 41 included in the power unit 20 is transmitted to the left and right rear wheel axles 21a, 21b via a centrifugal clutch 42, a deceleration mechanism 43 and a differential mechanism 44. The electric motor 41, the centrifugal clutch 42, the deceleration mechanism 43 and the differential mechanism 44 are housed in a unitary unit case 51.

A PDU (Power Drive Unit) 45, configured to control the output from the electric motor 41, is placed in the front end portion of the unit case 51. The PDU 45 includes an ECU which is its electronic control unit. An accelerator opening signal based on the manipulation of an accelerator controller is inputted into the PDU 45. On the basis of this accelerator opening signal, the operation of the PDU 45 and the BMU is controlled. Electric power outputted from the high-voltage battery is transformed by the PDU 45 from DC electric power into three-phase AC electric power. Thereafter, the three-phase AC electric power is supplied to the electric motor 41 which is a three-phase AC motor. In the drawing, reference numeral 45' denotes the PDU as placed in the upper portion of the unit case 51.

The power unit 20 transmits the rotary driving power of a rotor 41a of the electric motor 41 to a first driving shaft 47 via the centrifugal clutch 42, transmits the rotary driving power of the first driving shaft 47 to a housing 44a of the differential mechanism 44 via the deceleration mechanism 43 which is of a geared type, and transmits the rotary driving power having been transmitted to the housing 44a to the left and right rear wheel axles 21a, 21b via gears 44b, 44c of the differential mechanism 44. The electric motor 41 and the centrifugal clutch 42 share a driving center axis C3 which extends in the left-right direction. The differential mechanism 44 and the left and right rear wheel axles 21a, 21b share a driving center axis C2 which extends in the left-right direction.

The unit case 51 of the power unit 20 is divided into a center case body 52 provided across a vehicle left-right center line CL, a left case body 53 attached to the left side of the center case body 52, and a right case cover 54 attached to the right side of the center case body 52. Each of the case bodies 52, 53 and the right case cover 54 is a unitary product cast, for example, from an aluminum alloy.

In the center case body 52, a left space portion opened leftward and a right space portion opened rightward are formed on the two sides of a center wall portion 52a which is situated inward of the left and right end portions of the center case body 52 in the left-right direction. The front portion of the center wall portion 52a is on the right side of the vehicle body left-right center line CL, and the rear portion of the center wall portion 52a is on the left side of the vehicle body left-right center line CL. A front bearing portion 55 configured to support the right side portion of the first driving axle 47 with a front bearing 55a is provided at the front portion of the center wall portion 52a. A rear bearing portion 56 configured to support the right side portion of the left rear wheel axle 21a with a rear bearing 56a is provided at the rear portion of the center wall portion 52a. A middle bearing portion 59 configured to support the left end portion of a joint shaft 43a of the deceleration mechanism 43 with a middle bearing 59a is provided at the right side surface (outer side surface) between the front and rear bearing portions 55, 56.

The left case body 53 is shaped like a container which is opened rightward (toward the vehicle body left-right center). A left outer space portion is formed in its inside. A left front bearing portion 57 configured to support the left end portion of the first driving shaft 47 with a left front bearing 57a is provided on the front inner side surface of the left side wall portion of the left case body 53. A left rear bearing portion 58 configured to support the left side portion of the left rear wheel axle 21a with a left rear bearing 58a is provided at the rear portion of the left side wall portion thereof. A brake base 72 of a drum brake 71 for the left rear wheel 4a is integrally formed on the rear outer side of the left side wall portion. The front portion of the center case body 52 and the front portion of the left case body 53 form a motor case 51a which houses the electric motor 41 and the centrifugal clutch 42. The rear portion of the center case body 52 and the rear portion of the left case body 53 form a left axle case 51b which houses the left rear wheel axle 21a.

The right case cover 54 is shaped like a tray which is opened leftward (toward the vehicle body left-right center). A right outer space portion is formed in its inside. A right front bearing portion 61 configured to support the right end portion of the first driving shaft 47 with a right front bearing 61a is provided on the front inner side surface of the right side wall portion of the right case cover 54. A right rear bearing portion 62 configured to support the right side portion of the right rear wheel axle 21b with a right rear bearing 62a is provided at the rear portion of the right side wall portion thereof. A right middle bearing portion 63 configured to support the right end portion of the joint shaft 43a with a right middle bearing 63a is provided on the inner side surface thereof between the right front bearing portion 61 and the right rear bearing portion 62. The center case body 52 and the right case cover 54 form a gear case 51c which houses the deceleration mechanism 43 and the differential mechanism 44.

A right axle case 51d which houses the right rear wheel axle 21b is integrally formed on the rear right side of the right case cover 54. A right outer rear bearing portion 64 configured to support the right side portion of the right rear wheel axle 21b with a right outer rear bearing 64a is provided at the right end portion of the right axle case 51d. A brake base 76 of a drum brake 75 for the right rear wheel 4b is integrally formed on the outer periphery of the right end portion of the right axle case 51d.

The electric motor 41 includes the rotor 41a integrally rotatably supported by the outer periphery of a driving cylinder 47a in which the first driving shaft 47 is inserted. A stator 41b is situated around the outer periphery of the rotor 41a, and fixed to the center case body 52. A ring-shaped bus bar module 41c which is placed overlapping the rotor 41a when viewed in the axial direction is supported by the right inner periphery of the stator 41b. One end of a motor cord 45a is fixed to the PDU 45, while the other end of the motor cord 45a is fixed to the bus bar module 41c. A terminal portion 41d of the bus bar module 41c, to which the motor cord 45a is fixed, is placed overlapping the vehicle body left-right center line CL. In the drawing, reference numeral 41e denotes a number-of-revolutions sensor which is fixed to the center wall portion 52a, and which is configured to detect the number of revolutions of the first driving shaft 47.

The centrifugal clutch 42 is a clutch configured to start the motor tricycle 1. Once the number of revolutions of the electric motor 41 for the starting becomes equal to or greater than a predetermined value, the centrifugal clutch 42 transmits the driving power of the electric motor 41 to the first driving shaft 47. The centrifugal clutch 42 includes a clutch outer 42a shaped like a closed-end cylinder which is opened rightward (on the inner side of the vehicle body left-right direction), and fixed to the left end portion of the first driving shaft 47. A clutch inner 42b is situated inside the inner periphery of the clutch outer 42a, and fixed to the left end portion of the driving cylinder 47a. A centrifugal weight 42c is situated inside the inner periphery of the clutch outer 42a, and swingably supported by the clutch inner 42b.

The centrifugal weight 42c is separated from the inner peripheral surface of the clutch outer 42a while the number of revolutions of the electric motor 41 is less than the predetermined value. Once the number of revolutions of the electric motor 41 becomes equal to or greater than the predetermined value, the centrifugal weight 42c expands and frictionally engages with the inner peripheral surface of the clutch outer 42a. This frictional engagement enables the transmission of torque between the clutch outer 42a and the clutch inner 42b, and accordingly enables the driving power of the rotor 41a to be transmitted to the first driving shaft 47.

A motor cover 48 formed from a metal-made flat plate, for example, is placed between the centrifugal clutch 42 and the electric motor 41. The motor cover 48 is fastened and fixed to the center case body 52, for example, by a bolt B3 which is screwed into the center case body 52 from the left. This motor cover 48 checks the influence of heat between the centrifugal clutch 42 and the electric motor 41, and has a dust-prevention effect as well.

The deceleration mechanism 43 includes a first small-diameter gear 43b, for example, integrally formed on the outer periphery of the right side portion of the first driving shaft 47. A first large-diameter gear 43c is integrally rotatably supported by the left side portion (on the inner side in the vehicle body left-right direction) of the joint shaft 43a which is in parallel with the first driving shaft 47. A second small-diameter gear 43e, for example, is integrally formed on the right side portion (on the outer side in the vehicle body left-right direction) of the joint shaft 43a, and adjacent to the first large-diameter gear 43c. A second large-diameter gear 43f integrally rotatably supported by a left cylindrical portion 44e of the housing 44a of the differential mechanism 44. The first small-diameter gear 43b and the first large-diameter gear 43c are in mesh with each other, and thereby constitute a first deceleration gear pair 43d. The second small-diameter gear 43e and the second large-diameter gear 43f are in mesh with each other, and thereby constitute a second deceleration gear pair 43g. The deceleration mechanism 43 is placed not overlapping the vehicle body left-right center line CL.

The differential mechanism 44 transmits the driving power, which has been transmitted to the housing 44a, to the left and right rear wheel axles 21a, 21b while appropriately allocating the driving force between the left and right rear wheel axles 21a, 21b. The differential mechanism 44 includes the left and right differential side gears 44c having an axis extending in the left-right direction, and placed coaxially with each other. Paired differential pinion gears 44b have an axis orthogonal to the left-right direction, and are placed coaxially with each other. A housing 44a which houses these gears 44b, 44c.

A carrier pin 44d penetrating through a housing portion of the housing 44a, which houses the gears 44b, 44c, in a direction orthogonal to the left-right direction is supported by the housing portion. The paired differential pinion gears 44b are supported by the carrier pin 44d. The left or right differential side gears 44c and the corresponding one of the paired differential pinion gears 44b are bevel gears that mesh with each other with their rotation center axes intersecting at right angles. The left and right inner end portions of the left and right rear wheel axles 21a, 21b, which penetrate through the left and right sides of the housing 44a, are integrally rotatably inserted into the left and right differential side gears 44c, for example by spline fitting, respectively.

In a case where the movement distances and road surface resistances are equal to each other between the left and right rear wheels 4a, 4b while the driving power is transmitted to the housing 44a, the paired differential pinion gears configured to revolve together with the housing 44a do not rotate on their own axis, so that the left and right differential side gear 44c, the left and right rear wheel axles 21a, 21b, as well as the left and right rear wheels 4a, 4b rotate at the same speed. In a case where the movement distances or the road surface resistances are different from each other between the left and right rear wheels 4a, 4b, the paired differential pinion gears 44b rotate on their own axes as needed, and thereby make the revolution speeds different between the left and right differential side gears 44c, between the left and right rear wheel axles 21a, 21b, as well as between the left and right rear wheels 4a, 4b.

Left and right cylindrical portions 44e, 44f shaped like a cylinder are integrally formed on the left and right side portions of the housing 44a, respectively. The left cylindrical portion 44e is formed with a length enough for the left cylindrical portion 44e to penetrate through the rear bearing portion 56 adjacent to the left side of the housing portion. The right cylindrical portion 44f is formed relatively long enough for the right cylindrical portion 44f to reach the rear bearing portion which is away from the right side of the housing portion. The second large-diameter gear 43f is supported by the outer periphery of the right side portion of the right cylindrical portion 44f. The differential mechanism 44 is placed in a way that makes the left side portions of the housing 44 overlap the vehicle body left-right center line CL.

The left and right drum brakes 71, 75, for example, include brake drums 73, 77 integrally formed on wheel cores of the left and right rear wheels 4a, 4b. Brake bases 72, 76 are placed in a way that closes the opening portions of the brake drums 73, 77. Paired brake shoes 74, 78 are supported by the brake bases 72, 76, and caused to face to the insides of the brake drums 73, 77, respectively. Anchor pins 74a, 78a serving as rotary shafts of the paired brake shoes 74, 78 are fixedly provided at the brake bases 72, 76, respectively. Camshafts 74b, 78b configured to operate the paired brake shoes 74, 78 to expand are rotatably supported by the brake bases 72, 76. The base end portions of brake arms 74c, 78c linked to the brake controllers are attached to protruding end portions of the camshafts 74b, 78b which protrude inward in the vehicle left-right direction.

In the side view of the vehicle body shown in FIG. 2, a straight line L1, which joins the axial center (axis C3) of the electric motor 41 and the axial center (axis C2) of the differential mechanism 44 (and the rear wheels 4a, 4b), extends in the front-rear direction of the vehicle body. To put it specifically, the straight line L1 extends inclining in a way that becomes higher toward the front in the front-rear direction of the vehicle body. The axial center (indicated by the axis C4 in the drawing) of the joint shaft 43a is placed under the intermediate portion of the straight line L1. The axial center of the electric motor 41, the axial center of the differential mechanism 44 and the axial center of the joint shaft 43a are placed in a way that draws a triangle in the side view of the vehicle body. The rear portion of the stator 41b of the electric motor 41 and the front portion of the housing 44a of the differential mechanism 44 overlap each other in the side view of the vehicle body.

Referring to FIGS. 2 and 3, the PDU 45 is fixed to the front end portion of the power unit 20 while being located across the front end portions respectively of the center case body 52 and the left case body 53. The PDU 45 is shaped like a rectangular parallelepiped whose left-right width is larger and whose front-rear thickness is shorter. A front wall portion 45b of the PDU 45 is formed from an aluminum alloy or the like, and multiple heat radiation fins 45c are formed on this front wall portion 45b.

A unit housing portion 65 to house the PDU 45 except its front wall portion 45b is provided at the front end portion of the power unit 20. The unit housing portion 65 is formed from the front end portion of the center case body 52 as well as the front end portion of the left case body 53, and is divided into the left and right parts along the division surface between the center case body 52 and the left case body 53. The outer peripheral portion of the front wall portion 45b of the PDU 45 is fastened and fixed to the peripheral edge portion of the front end opening of the unit housing portion 65 by use of multiple bolts B1 which are screwed from the front.

The left-right width H1 including the housing portion 65 of the PDU 45 is set wider than the left-right width of the placement space for the electric motor 41, the differential mechanism 44, the centrifugal clutch 42 and the deceleration mechanism 43. In other words, the electric motor 41, the differential mechanism 44, the centrifugal clutch 42 and the deceleration mechanism 43 are placed within the range of the left-right width H1 of the controller. This scheme is similarly applied to a case where the PDU 45 is placed in any one of the upper, lower and rear end portions of the unit case 51.

In the side view of the vehicle body shown in FIG. 2, the controller is placed situated on the extension of the straight line L1 joining the axial center of the electric motor 41 and the axial center of the differential mechanism 44 (and the rear wheels 4a, 4b). This reduces the vertical width of the module including the power unit 20 and the controller, enhances the degree of freedom in laying out the peripheral parts, and secures the height above the ground or the lower center of gravity.

As described above, the motor tricycle 1 (the electric three-wheel vehicle) of the embodiment includes the front wheel 2 as the single driven wheel, and rear wheels 4a, 4b as the paired left and right driving wheels. The power unit 20 is provided between the left and right driving wheels 4a, 4b. The power unit 20 includes center case body 52, and case body 53 attached to one of the left and right sides of the center case body 52. Right case cover 54 covers the other of the left and right sides of the center case body 52. Electric motor 41 is placed between the center case body 52 and the left case body 53. Deceleration mechanism 43 is placed between the center case body 52 and the right case cover 54; and the differential mechanism 44 placed between the center case body 52 and the right case cover 54. The electric motor 41 and the differential mechanism 44 are placed near the vehicle body left-right center CL, and allocated to the left and right sides of the vehicle body. At least parts respectively of the electric motor 41 and the differential mechanism 44 are placed on the vehicle body left-right center CL. The deceleration mechanism 43 is placed away from the vehicle body left-right center CL, and on the one of the left and right sides of the first case body 52.

This configuration places the electric motor 41 and the differential mechanism 44, which are bulky and heavy items, near the vehicle left-right center line CL in preference to the deceleration mechanism 43 whose weight is relatively easy to reduce, and can thereby enhance the weight balance between the left and right sides. In addition, this configuration makes the electric motor 41 and the differential mechanism 44 overlap each other in the left-right direction, and can thereby make the power unit 20 smaller in size by making the power unit 20 protrude less outward in the left-right direction.

The electric motor 41 is placed on one of the left and right sides of the vehicle body, and the differential mechanism 44 is placed on the other of the left and right sides of the vehicle body; and in the side view of the vehicle body, at least parts respectively of the electric motor 41 and the differential mechanism 44 overlap each other.

This configuration makes the electric motor 41 and the differential mechanism 44 overlap each other in the front-rear direction or in the vertical direction while reducing the left-right width of the power unit 20, and can thereby make the power unit 20 smaller in size in the side view of the vehicle body.

The power unit 20 can include the centrifugal clutch 42 configured to connect and disconnect the power transmission between the electric motor 41 and the deceleration mechanism 43. The centrifugal clutch 42 is placed beside the electric motor 41 on the one of the left and right sides of the vehicle body.

This configuration enables the vehicle to easily start with the assistance of the centrifugal clutch 42, and can enhance the weight balance between the left and right sides with the assistance of the centrifugal clutch 42 and the deceleration mechanism 43.

The power unit 20 can include the motor cover 48 configured to separate the electric motor 41 from the centrifugal clutch 42.

This configuration makes it possible to avoid the influence of the heat between the centrifugal clutch 42 and the electric motor 41.

The axle cases 51b, 51d configured to cover the left and right rear wheel axles 21a, 21b are integrally formed in the left case body 53 and the right case cover 54.

This configuration makes it possible to reduce the number of parts, and to enhance ease of the assembly.

The controller (PDU 45) for the electric motor 41 can be attached to the front end portion of the power unit 20, and the electric motor 41 and the differential mechanism 44 are placed within the range of the left-right width H1 of the controller.

This configuration can shorten wirings between the controller and the electric motor 41 by attaching the controller to the power unit 20, and makes it possible to easily assemble the power unit 20 and the controller to the vehicle body by building the power unit 20 and the controller as a unit.

The straight line L1 joining the rotation center (the axis C3) of the driving shaft (the driving cylinder 47a) of the electric motor 41 and the rotation center (the axis C2) of the differential mechanism 44 extends in the front-rear direction in the side view of the vehicle body, and the controller is placed crossing the straight line L1.

This configuration makes it possible to secure the space above the power unit 20 by placing the electric motor 41 and the differential mechanism 44, which are the heavy items, in the front-rear direction. In addition, this configuration makes it possible to make the positions of the electric motor 41 and the differential mechanism 44 lower, as well as to make the center of gravity of the power unit 20 lower.

It should be noted that the present invention is not limited to the foregoing embodiment; and for example, the electric motor 41 and the differential mechanism 44 may be placed by exchanging their positions in the left-right direction, or the centrifugal clutch 42 and the deceleration mechanism 43 may be placed by exchanging their positions in the left-right direction. The deceleration mechanism 43 may be of a chained type or of a belted type, instead of the geared type. Furthermore, no specific restriction is imposed on the vehicle body mode, and the vehicle body mode is not necessarily limited to the swing-type vehicle. The controller may be placed in any one of the upper, lower and rear end portions of the power unit 20 which are on the outer peripheral side of the rear wheel axles. A configuration in which a partition wall in lieu of the motor cover 48 is formed in the case unit 51 is also acceptable.

Moreover, the configurations of the foregoing embodiment are mere examples of the present invention, and the configurations can be variously modified within a scope not departing from the gist of the present invention.

EXPLANATION OF THE REFERENCE NUMERALS

1 MOTOR TRICYCLE (ELECTRIC THREE-WHEEL VEHICLE)
2 FRONT WHEEL (DRIVEN WHEEL)
4a, 4b REAR WHEEL (DRIVING WHEEL)
20 POWER UNIT
21a, 21b REAR WHEEL AXLE (DRIVING WHEEL AXLE)
41 ELECTRIC MOTOR
42 CENTRIFUGAL CLUTCH
43 DECELERATION MECHANISM (POWER TRANSMISSION MECHANISM)
44 DIFFERENTIAL MECHANISM
45 PDU (CONTROLLER)

48 MOTOR COVER (PARTITION WALL)
51b, 51d AXLE CASE
52 CENTER CASE BODY (FIRST CASE BODY)
53 LEFT CASE BODY (SECOND CASE BODY)
54 RIGHT CASE COVER (CASE COVER)
CL VEHICLE BODY LEFT-RIGHT CENTER LINE (VEHICLE BODY LEFT-RIGHT CENTER)
H1 LEFT-RIGHT WIDTH
C2, C3 AXIS (ROTATION CENTER)
T1 STRAIGHT LINE

The invention claimed is:

1. An electric three-wheel vehicle comprising:
a single driven wheel;
paired left and right driving wheels; and
a power unit provided between the left and right driving wheels, the power unit including a first case body, a second case body attached to one of the left and right sides of the first case body, a case cover covering the other of the left and right sides of the first case body, an electric motor placed between the first case body and the second case body, a power transmission mechanism placed between the first case body and the case cover, and a differential mechanism placed between the first case body and the case cover,
wherein the electric motor and the differential mechanism are placed near a vehicle body left-right center distributed between the left and right sides of a vehicle body, at least parts respectively of the electric motor and the differential mechanism are placed on the vehicle body left-right center, and wherein the power transmission mechanism is placed away from the vehicle body left-right center on the one of the left and right sides of the first case body.

2. The electric three-wheel vehicle of claim 1, wherein the electric motor is placed on one of the left and right sides of the vehicle body, and the differential mechanism is placed on the other of the left and right sides of the vehicle body, and wherein
in a side view of the vehicle body, at least parts respectively of the electric motor and the differential mechanism overlap each other.

3. The electric three-wheel vehicle of claim 1, wherein the power unit includes a centrifugal clutch configured to connect and disconnect power transmission between the electric motor and the power transmission mechanism,
the electric motor is placed on one of the left and right sides of the vehicle body, and the differential mechanism is placed on the other of the left and right sides of the vehicle body, and wherein
the centrifugal clutch is placed beside the electric motor on the one of the left and right sides of the vehicle body.

4. The electric three-wheel vehicle of claim 3, wherein the power unit includes a partition wall between the electric motor and the centrifugal clutch.

5. The electric three-wheel vehicle of claim 1, further comprising axle cases covering left and right driving wheel axles, said axles cases integrally formed in the second case body and the case cover, respectively.

6. The electric three-wheel vehicle of claim 1, further comprising a controller configured to control the electric motor, said controller being attached to any one of front, rear, upper and lower end portions of the power unit,
wherein the electric motor and the differential mechanism are placed within a range of a left-right width of the controller.

7. The electric three-wheel vehicle of claim 6, wherein, in a side view of the vehicle body, a straight line joining a rotation center of a driving shaft of the electric motor and a rotation center of the differential mechanism extends frontward and rearward, and wherein the controller is placed crossing the straight line.

8. An electric vehicle, comprising:
driven wheel means;
driving wheel means for driving the vehicle; and
power means for providing driving power to the driving wheel means, said power means being located between left and right wheels of the driving wheel means, said power means including first case body means, second case body means, and case cover means, said first case body means, second case body means, and case cover means, said power means further including motor means for providing rotating power and transmission means for transmitting said rotating power, said motor means and said transmission means being disposed between the first case body means the case cover means, and a differential means for dividing power between the left and right driving wheel means being placed between the first case body means and the case cover means,
wherein the electric motor means and the differential means are disposed near a vehicle body left-right center distributed between left and right sides of the vehicle body, wherein at least parts respectively of the electric motor means and the differential means are placed on the vehicle body left-right center, and wherein the transmission means are placed away from the vehicle body left-right center on one of the left and right sides of the first case body means.

9. The electric vehicle according to claim 8, wherein the electric motor means is placed on one of the left and right sides of the vehicle body, wherein the differential means is placed on the other of the left and right sides of the vehicle body, and wherein, in a side view of the vehicle body, at least parts respectively of the electric motor means and the differential means overlap each other.

10. The electric vehicle according to claim 8, wherein the power means includes clutch means for connecting and disconnecting power transmission between the electric motor means and the transmission means, wherein the electric motor means is placed on one of the left and right sides of the vehicle body, and the differential means is placed on the other of the left and right sides of the vehicle body, and wherein the clutch means is placed beside the electric motor means on one of the left and right sides of the vehicle body.

11. The electric vehicle according to claim 10, wherein the power means includes wall means for partitioning the electric motor means and the clutch means.

12. The electric vehicle according to claim 8, further comprising axle means for transmitting driving power to the driving wheels, and axle case means for covering the axle means, said axle case means being integrally formed in the second case body means and the case cover means, respectively.

13. The electric vehicle according to claim 8, further comprising controller means for controlling the electric motor means, said controller means being attached to any one of front, rear, upper, and lower end portions of the power means, wherein the electric motor means and the differential means are placed within a range of a left-right width of the controller means.

14. The electric vehicle according to claim 13, wherein, in a side view of the vehicle body, a straight line joining a rotation center of a driving shaft means of the electric motor means and a rotation center of the differential means extends frontward and rearward, and wherein the controller means is placed crossing the straight line.

* * * * *